United States Patent
Launay et al.

(10) Patent No.: US 8,300,815 B2
(45) Date of Patent: Oct. 30, 2012

(54) PROCESS TO SECURE A PERSONAL PORTABLE OBJECT

(75) Inventors: Nathalie Launay, Meudon (FR); Fabrice Perion, Meudon (FR); Joseph Leibenguth, Meudon (FR); Frederic Ros, Meudon (FR)

(73) Assignee: Gemalto SA, Meudon Cedex (FR)

( * ) Notice: Subject to any disclaimer, the term of this patent is extended or adjusted under 35 U.S.C. 154(b) by 1339 days.

(21) Appl. No.: 11/664,227

(22) PCT Filed: Sep. 28, 2005

(86) PCT No.: PCT/IB2005/002888
§ 371 (c)(1),
(2), (4) Date: May 18, 2007

(87) PCT Pub. No.: WO2006/038075
PCT Pub. Date: Apr. 13, 2006

(65) Prior Publication Data
US 2007/0269043 A1 Nov. 22, 2007

(30) Foreign Application Priority Data
Oct. 1, 2004 (EP) .................................... 04292348

(51) Int. Cl.
*H04L 9/00* (2006.01)
(52) U.S. Cl. ........................................... 380/46; 380/28
(58) Field of Classification Search .................. 380/46, 380/28
See application file for complete search history.

(56) References Cited

U.S. PATENT DOCUMENTS
2003/0210802 A1 11/2003 Schuessler

FOREIGN PATENT DOCUMENTS
DE  100 37 176 A1  2/2002
EP  0 334 616 A    9/1989

OTHER PUBLICATIONS

Lefebvre et al: "A print and scan optimized watermarking scheme", IEEE, 2001.*
Written Opinion issued in International Patent Application No. PCT/IB2005/002888 mailed on Jan. 19, 2006 (11 pages) with English translation of International Search Report (2 pages).
Notification of Transmittal of the International Search Report and the Written Opinion of the International Searching Authority, or the Declaration dated Jan. 19, 2006, relating to International Application No. PCT/IB2005/002888 (25 pages).

* cited by examiner

*Primary Examiner* — Matthew Bella
*Assistant Examiner* — Ruiping Li
(74) *Attorney, Agent, or Firm* — Osha • Liang LLP

(57) ABSTRACT

The invention relates to a process to make secure a personal portable object comprising a body of the personal portable object, a microchip, a printed image and a device to enable said personal portable object to communicate with an entity external to the device. The process includes using an image file and an insertion algorithm to generate an image feature vector Vsi(num), storing the image feature vector Vsi(num) in the microchip, using the printed image obtained by a scanning device to generate an image feature vector Vsi(dig), and using a read-back algorithm to match the image feature vector Vsi(num) and the image feature vector Vsi(dig).

18 Claims, 4 Drawing Sheets

PROCESS TO SECURE A PERSONAL PORTABLE OBJECT

FIELD OF INVENTION

This invention concerns a process to secure a personal portable object comprising a body, a microchip, a printed image and a means to allow said object to communicate with the outside world. It more particularly applies to chip cards.

BACKGROUND

Chip cards are standardized objects comprising a board, a chip and an interface to communicate with the outside world.

The card itself bears data that may be static, namely independent of their holder, or dynamic. The data is often printed on the card. It may for example be a card number. Similarly, the chip stores various different types of data.

The communications interface between the card and the outside world is formed by contacts on the surface of the body of the card or an antenna sunk into the said body. The card is called contact, contactless, hybrid or dual interface, depending on the communication means it features.

Chip cards can be made secure with a number of techniques.

Some techniques involve adding a physical security device to the body of the object.

In particular there is a technique whereby the physical security device is a nano barcode capable of generating a secure response, more specifically a magnetic signal, which is included in the card.

There is another special technique in which the security device is connected to another part of the portable object. This technique has been developed by company NOVATEC™ and its security device is called PROOFTAG™. It generates random bubbles. The PROOFTAG™ is verified by querying a database and cross-checking the data stored on the card's magnetic strip against the database, or the bubbles against the data printed on the body.

Emerging security solutions aim to securely match the data items stored in the chip with those concealed on the body of the card or entered via an external peripheral device capable of extracting biometric information from the card holder. One example of this type of innovation, KINEGRAM, is offered by the KURZ group (Keesing's Journal of Documents, issue 7, 2004), which matches secure data on the OVD (Optically Variable Device) with data encrypted in the chip.

However, of all the innovative solutions available, those consisting in inserting hidden data into the printed image (known as digital watermarking) would appear to be the most suitable and the most widespread to secure physical media including a microchip and an image such as a passport photograph because, among other things, they do not require any particular readable elements to be added in and/or the body of the card. These techniques are marketed under the names CRYPTOGLYPHE™, SCRAMBLED INDICIA™, IPI™ or ICI™.

Watermarking is similar to steganography.

Steganography consists in concealing a message to be transmitted confidentially in a set of apparently insignificant data in such a way that its presence cannot be detected. As in the case of cryptography, steganography can be used to exchange messages with a correspondent without others knowing it. But while standard cryptography relies on the fact that the message will in all likelihood not be understood, the security of steganography relies on the fact that the message will in all likelihood not be detected.

Watermarking differs from steganography primarily in its purpose. Rather than exchanging messages with correspondents, watermarking serves to render a medium secure, an image, sound or video in particular, by cleverly inserting a permanent mark in the said medium without visibly altering it in any way (comparable to noise in the language of signal processing).

Digital watermarking is used for digital images. It has become increasingly popular in recent years. This is primarily due to increasing need to protect transfers of images over the Internet. The technique consists in inserting a mark in digital images. The mark is invisible to the naked eye but can be read by a dedicated recognition system. The latter guarantees that the protected image is native.

A mark typically contains several tens of bits of data at the most. It may contain information regarding the permissions attached to the document, or an indication of the document owner's identity. As a result, anyone unlawfully claiming to be its owner can be exposed.

The following conditions are necessary for effective digital watermarking of chip cards bearing an image.

First of all, the mark must be highly resistant to printing and be very easy to read.

In practice, the mark does deteriorate (print weave, analogue/digital conversion), which results in added "noise", small geometric distortions and a change of scale generated by the acquisition chain. Such distortions impair synchronization of the image (finding markers in the image). Despite such distortions, the mark should be read from an analogue capture of the previously printed passport photo, for instance with a scanner, a digital camcorder, a Webcam camera or a digital camera.

Furthermore, the card and photograph undergo wear and tear, and sustain both "physical" and "calorimetric" damage so to speak, leading to faded colours, dirt or scratches as well as small geometric defects due to frequent and intensive use card bodies undergo. But the mark must be interpretable even if the passport photo has sustained such wear and tear.

Although digital watermarking techniques have proved to be the most promising for applications aimed at ensuring the security of the body of chip cards, state-of-the-art studies reveal that none of these techniques withstand all such damage to the image ('A print and scan optimized watermarking scheme', F. Lefèbvre, D. Guéluy, D. Delannay and B. Macq, IEEE Multimedia Signal processing, 2001).

In particular, most current approaches based on digital watermarking remain sensitive to damage resulting from a combination of several different damaging factors ('Perceptual quality evaluation of geometrically distorted images using relevant geometric transformation modeling', 1. Setyawan, D. Delannay, B. Macq, R. L. Lagendijk, proceedings of SPIE, Security and Watermarking of Multimedia Contents V, Vol 5020, 2003).

Ultimately, even though so-called $2^{nd}$-generation solutions are proposed in the literature to counter such attacks, digital watermarking is not yet a totally reliable solution for the purpose of reading the mark on a damaged image (Watermarking Digital Image and Video Data, G C Langelaar, I. Setyawan, R L Lagendijk, IEEE Signal processing Magazine", September 2000, volume 17-5, pages 20-46). Even though the attacks sustained by a card are difficult to characterize, there is no doubt that they include known attacks such as "print/scan", "geometric" and others, the outcome of which is clearly stated to be fragile by the scientific community.

Moreover, after reading the concealed physical security data, access to a database is more often than not necessary, which complicates the storage of the said data, its security and quite simply access to it.

SUMMARY

In view of the above, one of the problems this invention sets out to solve is to create a process making a personal portable object secure that compensates for the aforesaid drawbacks of the state of the art, does not necessarily require a physical element to be added to the body of the card, is more robust that the traditional digital watermarking technique and does not require access to a database to authenticate the protected object.

The first aspect of the solution to this problem as proposed by the invention is a process to guarantee the security of a personal portable object comprising the object's body, a microchip, a printed image and a device enabling the said object to communicate outside world, characterized by the fact that it includes the following stages: using an image file and insertion algorithm to generate an image feature vector Vsi(num) stored in the microchip; using a signal of the printed image captured by a scanning device to generate an image feature vector Vsi(dig); and using a read-back algorithm to match image feature vectors Vsi(num) and Vsi(dig).

This matching ensures there is a secure link between the microchip and the printed image, thereby confirming the validity of the object body/chip assembly. In addition, the way of protecting the data through traditional encryption techniques, the security of the card bodies is primarily guaranteed by the clever use of a digital signal of the ID picture without adding any physical or software elements to the card bodies (hologram, watermarking etc).

As a result, the possibility of fraud either on the body of the object or on the chip exchange is considerably limited.

The second part of the solution is a personal portable object comprising a body, a microchip, a printed image and means whereby the said object can communicate with the outside world, characterized by the fact that it also comprises an image feature vector Vsi(num) generated from an image file and an insertion algorithm.

DETAILED DESCRIPTION

In this description, the terms image file, pseudo-random sequence, algorithm, insertion algorithm, secret key S, microchip, image print signal and print signal scanning device are defined as follows.

By image file is meant any digital image file made up of elementary units (pixels—picture elements), each of which represent a portion of the image. The digital image may be composed of X×Y pixels, X and Y being anything between 256 and 1024 units. The dynamics of the digital image may comprise different shades of grey or colour.

By pseudo-random sequence is meant a series of integers x0, x1, x2, ... having any value in a set whereby M={0, 1, 2, ..., m-1} or M={-1, 0, 1} ...

By algorithm is meant an automatic process aiming to transform a given piece of data into another. This transformation is defined by saying that the input data is modified by an algorithm into output data, also called "result".

By insertion algorithm is meant an algorithm capable of computing a number of pieces of data according to a predefined protocol and storing them in media or a peripheral device, also according to a dedicated protocol.

By secret key S is meant a key unique to each chip, the function of which is to identify an image feature vector Vsi (num), and a signature of the ID image dependent on Vsi (num) and a secret computational algorithm. It is the input to the read-back algorithm, which performs a security function for the read-back phase. Without knowledge of the key, and therefore without the original chip, it is impossible to access the data required to authenticate the medium according to the invention.

By microchip is meant an electronic circuit on the surface of a small plate made of semi-conductor material, which includes all the necessary elements to perform a specific function. This term specifically refers to the small plate of semi-conductive material which is used to make the integrated circuit. And by extension, the term chip may also refer to the integrated circuit itself.

By printed image signal is meant the variations in a characteristic size of the image, variations that can be recorded.

Lastly, by scanning device is meant a scanner, digital camcorder, Webcam or digital camera.

The portable object made secure according to the invention is a chip card or any other secure portable object that includes a microchip. More particularly, this may include a secure passport or electronic signature.

In the case of a chip card, the card may be a contact card, a contactless card, a hybrid card or a dual interface card.

Figure 1A:
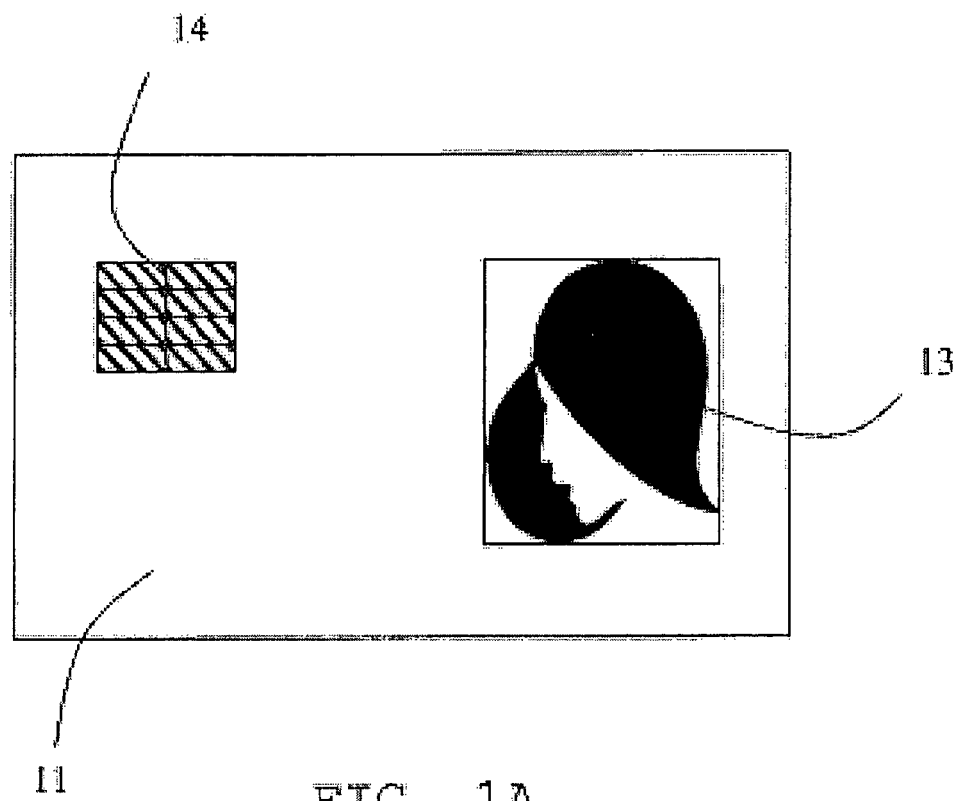
FIGS. 1A and 1B (respectively top and side views) show a method for making the card according to the invention.
Figure 1B:
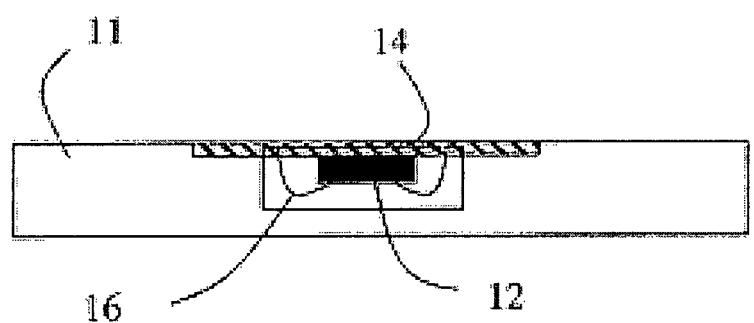

FIGS. 1A and 1B refer to a contact card. This card comprises a body 11, a microchip 12, a printed image 13 and a device allowing the said card to communicate with the outside world, the said device comprising a set of connecting pads 14.

The body of the card is formed by a series of thermoplastic layers assembled by hot-rolling. The dimensions are specified by standard ISO 7810. They are 86 mm (length), 54 mm (width) and 0.76 mm (thickness).

The chip is a microcontroller equipped with volatile (RAM) and non-volatile EEPROM-type memory. For certain security applications it may contain an associated encryption processor. This chip 12 features contacts, which are connected to the card's connecting pads 14 by conductive wires 16 (wire bonding) in the example shown in FIGS. 1A and 1B. It is also coated with a protective resin, the chip 12, wires 16, protective resin and connecting pads 14 altogether forming a micromodule incorporated into a cavity in the body of the card 11.

Printed image 13 is made up of visible data on the body of the object, characterizing the holder of said object.

Preferably, printed image 13 is a visible colour or black-and-white photograph of the card holder.

Figure 2:
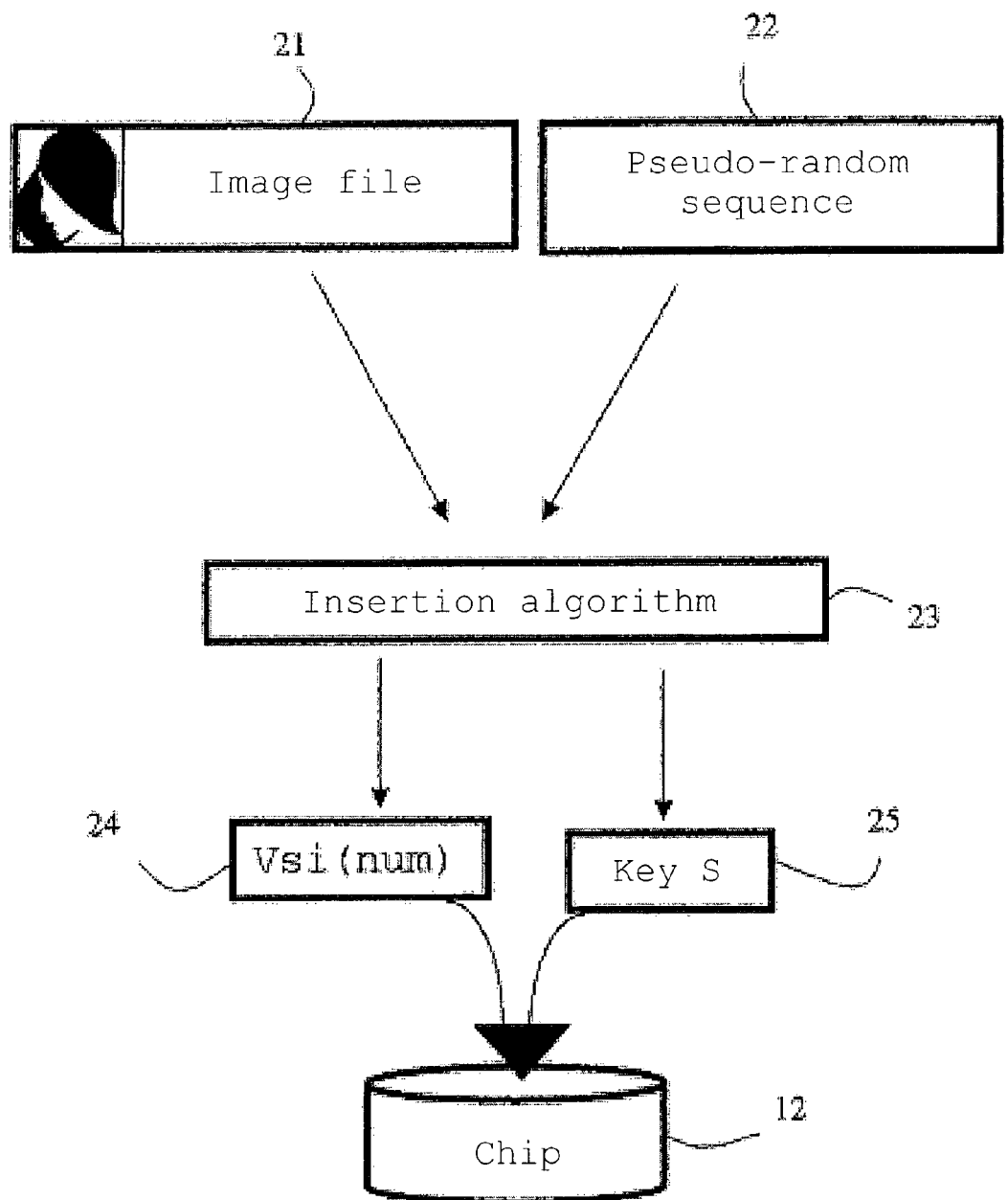
FIG. 2 shows the stages whereby the image feature vector Vsi(num) and key S are generated then stored in the chip, according to the process of the invention.

FIG. 2 shows the first stage of the process according to the invention. This is the stage at which image file 21 is used to generate pseudo-random sequence 22 and insertion algorithm 23, image feature vector Vsi(num) 24 and secret key S 25, intended to be stored in a memory of microchip 12 or another of the object's chips.

Preferably, image feature vector Vsi(num) 24 and secret key S 25 are stored in a memory of microchip 12.

Implementation of this initial stage requires no modification of the card production lines, insofar as the data to be stored in chip 12 are extracted and analysed directly from image file 21, which is used to print image 13 on the body of the card 11.

Consider a customized contact chip card, bearing a photograph of its holder, the photograph being a 24-bit encoded (8 bits per channel) passport photograph measuring 512×512 pixels. Now consider a multi-level division of the image into blocks sized $k_1 \times k_2$, where $k_1$ and $k_2$ are divisors of 512. Say $k_1 = k_2$ and six levels of division into juxtaposed blocks, namely 32×32 blocks or sub-images measuring 16×16 pixels and 16×16 blocks of sub-images measuring 32×32 pixels and 8×8 blocks measuring 64×64 pixels, 4×4 blocks measuring 128×128, 2×2 blocks measuring 256×256, 1 block measuring 512×512. The union of all these sub-images therefore forms a subset of 1365 images (1+4+16+64+256+1024). Each sub-image is encoded with an index representing the level of division (the block of 512×512 being level 0) and a second index indicating its position in the division. For each division level i, $k_i$ representatives of varying origins (spatial, frequency or geometric components) selected for their stability in respect of the ageing of the photo and for their differentiation capacity) of these sub-images can be extracted, $k_{ij}$ therefore symbolizing component number j for division level i.

The secret key S generated by the pseudo-random sequence will both allow a number of active $k_b$ blocks to be selected from among the 1361 images and for each active block $k_{is}$ the number of active features for the subsequent authentication of the medium. To simplify the system as a whole, we nonetheless consider that each division level matches a dedicated subset of features.

By way of illustration, say $k_b = 500$, $k_i = 10$ and $k_{is} = 5$.

There are 1365!/(865!×500!) ways of choosing 500 images out of 1361. The first 1361 bits of secret key S represent the selection of blocks.

There are 10!/(5!×5!)=252 different ways of choosing 5 elements out of 10. The next 24 bits are used to select the features, 4 bits sufficing to encode the subset of active features per level of division.

The last 64 bits of secret key S are reserved to store a particular signature feature of the resulting division. The signature is obtained with an insertion algorithm combining one piece of data from each selected block in levels 5 and 6.

At the insertion phase, key S is thus generated, as are the features of the active images, to be stored in the chip. Among the selected active images, those having insufficient features (too little data in the signal) will automatically be invalidated. As far as possible, they will be replaced by valid blocks. The same approach is used for the features. If any selected feature presents an efficiency too far removed from a non-selected feature in relation to the image signal present, it is invalidated and replaced.

The function of pseudo-random sequence 22 is to notify the subset of features making up image feature vector Vsi (num) 24 and generate part of secret key S 25 (therefore, indirectly, the image signature linked to the division). The division of the image into sub-images advantageously allows one to consider features representing the basic image at several levels of fineness and over all its parts, without having to memorize the entire image of the digital file in the chip.

This division of the image into sub-images also allows one to refine the decision of whether or not the medium is valid. The latter is based on the combination of kb images, the division of the image into sub-images leading to decisional redundancy, and among other things enables filtering of local defects (dirt, scratches etc), which are nonetheless acceptable because they are caused by ageing.

In addition, this division of the image into sub-images offers the advantage of offering higher security without any added data, unlike watermarking techniques. Indeed, even though there is a very remote chance of falsifying a fake ID photo so that its features match those of the chip originating from the digital file of the original photo, a falsification of kb images is unlikely.

Furthermore, this division of the image into sub-images guarantees the conformity of secret key S. This is because an image signature computed with a secret algorithm corresponds to a given division, so the signature/division pair can only be copied if one knows both the algorithm and the division.

The main stages of the insertion are reading the digital file, processing the image, encrypting S and Vsi(num), and storing them in the chip.

Figure 3:
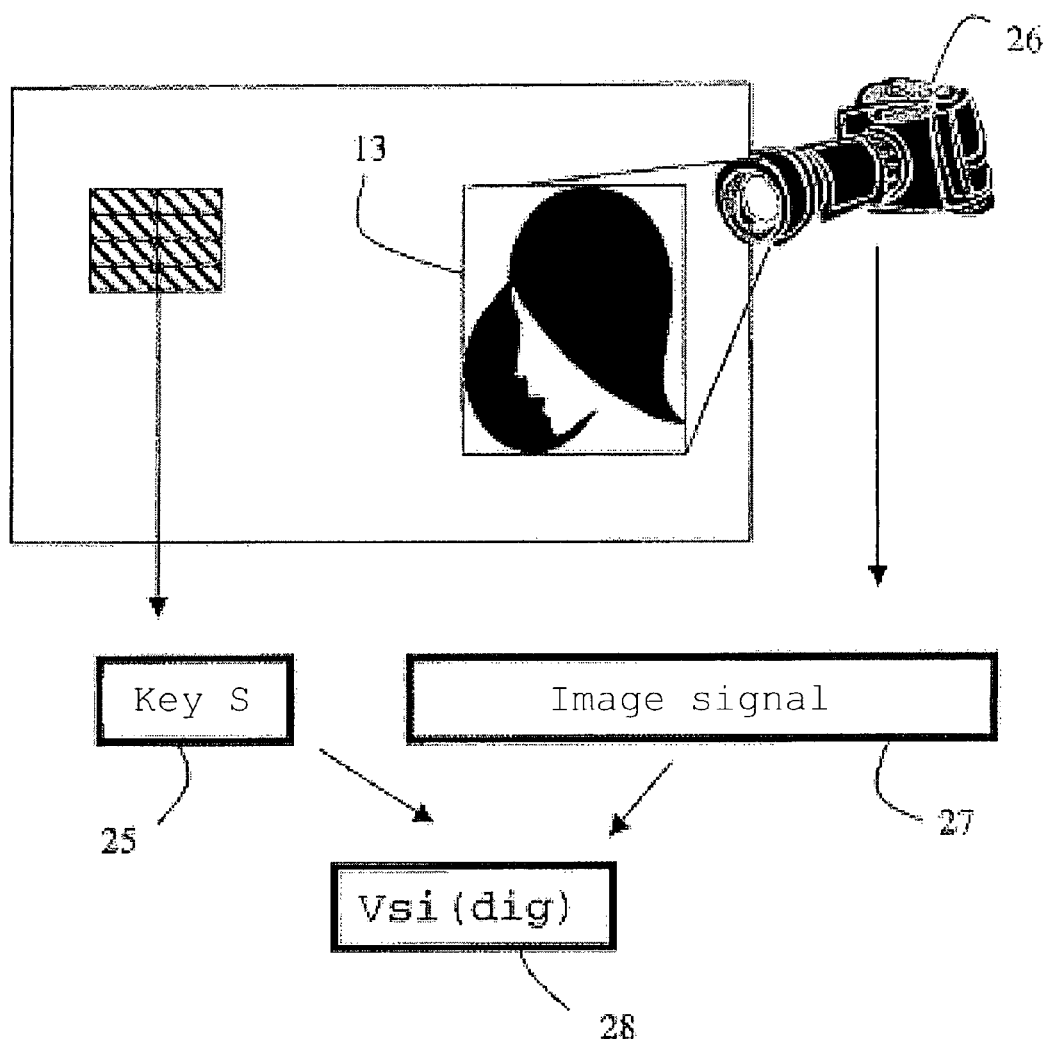
FIG. 3 shows the stages whereby image feature vector Vsi (dig) is generated according to the process of the invention.

FIG. 3 illustrates a second stage according to the invention. This is stage at which a signal of printed image 27 scanned by scanning device 26 and secret key S 25 extracted from microchip 12 is used to generate image feature vector Vsi(dig) 28.

At this stage (generation of feature vector Vsi (dig) 28), the software on the host computer scans and pre-processes the image of the ID photo, for use in the last stage (matching).

Printed image 27 is advantageously produced from image file 21.

Figure 4:
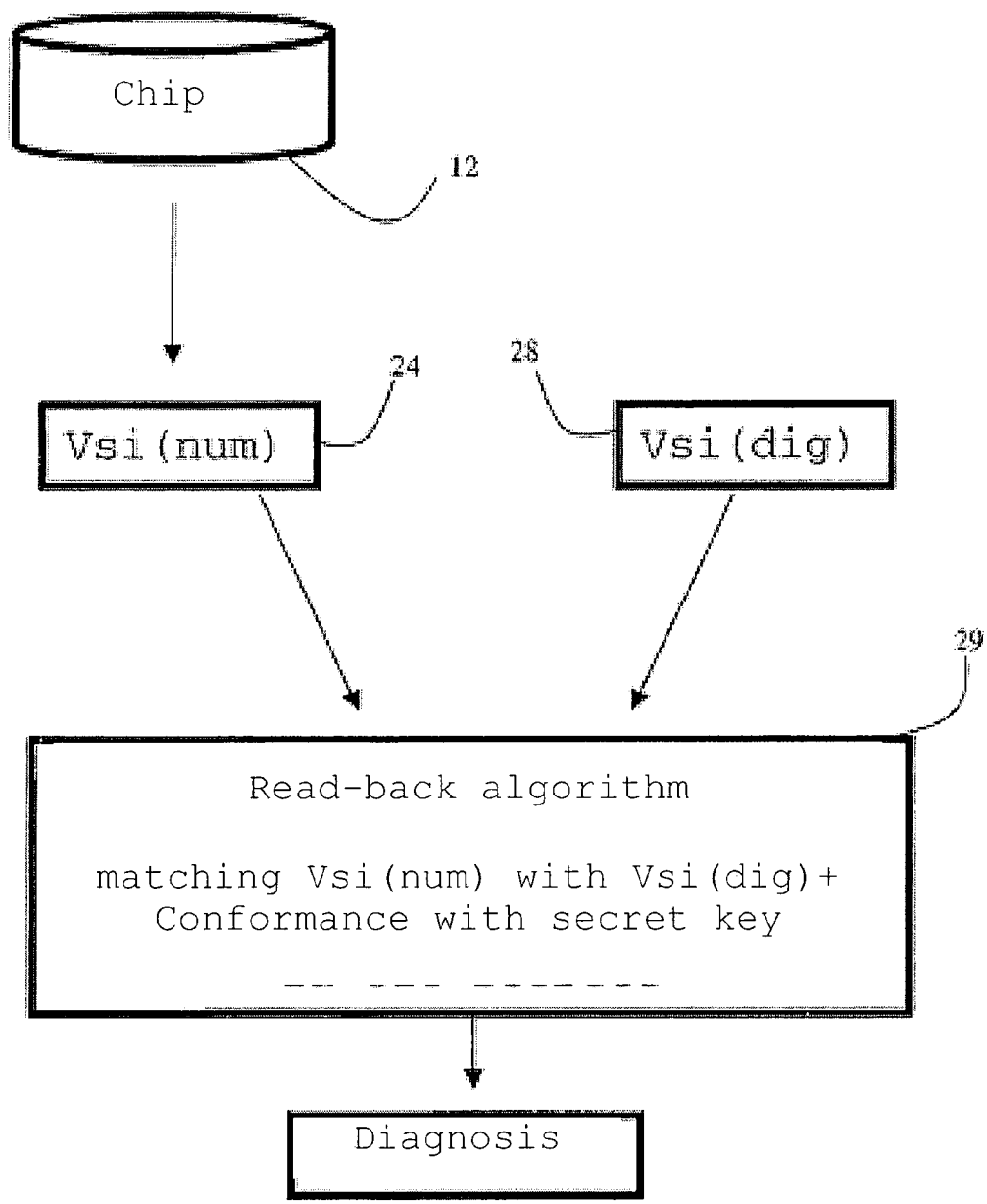
FIG. 4 shows the stages whereby image feature vectors Vsi(num) and Vsi(dig) are matched according to the process of the invention.

Lastly, FIG. 4 shows a third stage according to the invention. This involves using read-back algorithm 29 to match image feature vectors Vsi(num) 24 and Vsi(dig) 28. This matching allows the medium to be validated or invalidated, thereby ensuring there is effectively a secure link between the signal of printed image 27 and the data in the memory of microchip 12 as produced by image file 21.

At this matching stage, the software on the host computer queries the chip to extract secret key S and its decryption. The software on the host computer also allows the successive extraction of the features of the $k_b$ images as defined above, in a randomly generated order (which can be decoded by the host computer). As a result, the data in transit between the chip and the host computer is difficult to interpret, because each medium (card, object etc) has its own order.

Moreover, the software on the host computer decrypts the data on the chip, computes the features of the scanned image according to the pattern stated by secret key S, and matches the data at each level. This entails the decision as to whether or not the card medium is secure. The acceptance thresholds relating to differences between Vsi (num) and Vsi (dig) are worked out with statistical reference tests.

A local procedure readjusting scanned image 30 is integrated to handle any image synchronization problems.

According to the invention, read-back algorithm 29 generates a bit (i.e. binary digit) indicating the validity of the portable object by comparing image feature vector Vsi(num) 24 extracted from the chip with knowledge of key S and image feature vector Vsi(dig) 28, directly computed on the signal retrieved by the image scan.

In one method of achievement, read-back algorithm 29 is dissociated from microchip 12.

In another method of achievement, read-back algorithm 29 is partially integrated in microchip 12.

Key S is unique to a microchip. Therefore, the method for extracting image data and the method for matching the distance between said image feature vector Vsi(num) 24 and said image feature vector Vsi (dig) 28 directly computed on the signal retrieved by the image scan, vary from one medium to another.

By avoiding the need to access databases, this method of matching data between two elements of the car medium therefore also limits data security problems.

Moreover, the idea of using a secret key has a twofold advantage. It reduces data storage in the chip because both a subset of images and a subset of features are selected. It also mitigates the risk of fraud by making unique the process reading and matching data from one chip to the next.

According to the invention, secret key S 25 guides the process of matching the two feature vectors Vsi(num) 24 and Vsi(dig) 28.

Secret key S 25 therefore plays a dual security role. Firstly, it tells read-back algorithm 29 which subset of image features has been pre-selected by insertion algorithm 23. In addition, it defines image feature vector Vsi(num) 24, which serves as a basis for data matching. Its authentication is achieved thanks to a digital image signature linked to the subset of selected images.

Ultimately, the invention concerns a secure link between printed image signal 27 and the data in the memory of microchip 12 extracted from digital file 21. This link has the following advantages:

it precludes the need to use databases, which entails storage security and database access problems;

its industrialization does not require any alterations to production line plant or processes, and more particularly to the customization of chip cards, either the chip software customization stages or the card body customization stages (printing and protecting the print with varnish or a patch);

it is such that any change to printed image 13 or microchip 12 is infallibly detected by the authentication system, which declares the medium invalid;

it is such that in the presence of microchip 12 and native printed image 13, even if worn, the authentication system confirms the validity of the medium; and it is secure in that the image data alone cannot be used to validate the link between the physical entity and the data in the chip.

One alternative is the division of the image.

In one method of achievement, the division of the image can be characterized as static, because it is the same, whatever the image (in multiples of 2).

In another method of achievement, a dynamic division method may be considered, this having the advantage of dividing up the image in an adaptable manner. This method of achievement results in a better balance of the quantity of data contained in sub-images belonging to the same level of division, as well as the uniqueness of the division, making it more difficult for any swindler to understand the process.

Another alternative is the read-back software.

According to one method of achievement, the process according to the invention includes a stage whereby data is extracted from the chip with a view to being processed by the host computer.

According to another method of achievement, the host computer directly computes the features of the scanned image and lets the chip match the data. This aims to avoid extracting data from the chip.

A third alternative is the storage of secret key S and feature vector Vsi(num) in the chip. Compression or encryption of secret key S and feature vector Vsi(num) can be envisaged, thereby minimizing memory requirements.

The invention claimed is:

1. A process to make secure a personal portable object comprising a body of the personal portable object, a microchip, a printed image and a device to enable said personal portable object to communicate with an entity external to the device, the process comprising:

using an image file comprising a stored image and an insertion algorithm to generate an image feature vector Vsi(num), wherein generating the image feature vector Vsi(num) comprises:

dividing, for each division level of a plurality of division levels, the stored image into sub-images sized according to the division level to obtain a first plurality of sub-images corresponding to the plurality of division levels, wherein, for each division level, sub-images of the division level comprise a different number of pixels than sub-images of each other division level, and wherein, for each division level, at least one sub-image of the division level overlaps at least one sub-image of each other division level, selecting, from the first plurality of sub-images, a first selection of sub-images using a pseudo-random sequence, and combining data from the first selection of sub-images to generate Vsi(num);

storing the image feature vector Vsi(num) in the microchip;

using a read-back algorithm to match the image feature vector Vsi(num) and an image feature vector Vsi(dig) obtained using the printed image.

2. The process of claim 1, wherein the image feature vector Vsi(num) is generated concurrently with the generation of a secret key, wherein the secret key is stored in the microchip, and wherein the secret key is used to generate the image feature vector Vsi(dig).

3. The process of claim 1, wherein the printed image is generated by the image file.

4. The process of claim 1, wherein the personal portable object is made secure by a secure link between the printed image and the stored image.

5. The process of claim 1, wherein the read-back algorithm is dissociated from the microchip.

6. The process of claim 1, wherein the read-back algorithm is partially integrated into the microchip.

7. The process of claim 1, wherein the printed image comprises data visible on the body of the personal portable object and wherein the printed image is characteristic of a holder of said personal portable object.

8. The process of claim 1, wherein the printed image is formed by at least one selected from a group consisting of a visible color photograph and a black-and-white photograph of a holder of the personal portable object.

9. The process of claim 1, wherein the scanning device is one selected from a group consisting of a scanner, a digital camcorder, a webcam and a digital camera.

10. The process of claim 1, wherein the image feature vector Vsi(num) and the secret key are saved in at least one selected from a group consisting of a memory of the microchip and another chip on the personal portable object.

11. The process of claim 1, wherein the image feature vector Vsi(num) and secret key are saved in a memory of microchip.

12. A personal portable object comprising:

a body, a microchip,
a printed image; and
a device enabling the object to communicate with an entity external to the object,
wherein the object comprises an image feature vector Vsi(num) generated from an image file comprising a stored image and an insertion algorithm, wherein generating the image feature vector Vsi(num) comprises:
dividing, for each division level of a plurality of division levels, the stored image into sub-images sized according to the division level to obtain a plurality of sub-images corresponding to the plurality of division levels,
wherein, for each division level, sub-images of the division level comprise a different number of pixels than sub-images of each other division level, and
wherein, for each division level, at least one sub-image of the division level overlaps at least one sub-image of each other division level,
selecting, from the plurality of sub-images, a selection of sub-images of the stored image using a pseudo-random sequence, and
combining data from the selection of sub-images to generate Vsi(num).

13. The personal portable object of claim 12, further comprising:
a secret key generated using the image file, a pseudo-random sequence and the insertion algorithm.

14. The personal portable object of claim 12, wherein a first portion of bits of the secret key represent the first selection of sub-images, a second portion of bits of secret key are used to select features and a third portion of bits of the secret key are reserved for registering a signature obtained from the insertion algorithm, wherein the insertion algorithm obtains the signature by combining data from each selected sub-image in the selection of sub-images on division levels n and n−1, n being a value between 3 and 6 inclusive.

15. The personal portable object of claim 12, wherein the personal portable object is a chip card.

16. A method to make secure a personal portable object comprising a body of the personal portable object, a microchip, a printed image and a device to enable said object to communicate with the outside world, the method comprising:
generating a secret key and a first image feature vector Vsi(num) from an image file representing said printed image stored in microchip, wherein said step for generating said secret key and said first image feature vector Vsi(num) comprises:
dividing said image file into sub-images of different n-levels of fineness,
wherein, for each n-level of fineness, sub-images of the n-level of fineness comprise a different number of pixels than sub-images of each other n-level of fineness, and
wherein, for each n-level of fineness, at least one sub-image of the n-level of fineness overlaps at least one sub-image of each other n-level of fineness;
selecting said sub-images from each of said levels using a pseudo-random sequence;
generating said first feature vector Vsi(num) having a selected feature from each of said selected sub-images;
generating a digital signature by combining data from a selection of sub-images; and
generating said secret key from information representing a selection of said sub-images, information representing selected features for each sub-image and said digital signature;
storing said first image feature vector Vsi(num) and said secret key in said microchip;
comparing a second image feature vector Vsi(dig) with said first image feature vector Vsi(num) using a read-back algorithm to match the first image feature vector Vsi(num) and the second image feature vector Vsi(dig); and
confirming the validity of said object body and said microchip when said second image feature vector Vsi(dig) matches said first image feature vector Vsi(num).

17. The method of claim 1, further comprising:
using the printed image obtained by a scanning device to generate the image feature vector Vsi(dig) by:
selecting, from a plurality of sub-images of the printed image, a second selection of sub-images using a secret key generated by the pseudo-random sequence, and
combining data from the second selection of sub-images to generate Vsi(dig).

18. The method of claim 16, further comprising:
using the image signal obtained by scanning said printed image by means of a scanning device and said secret key stored in said microchip to generate said second image feature vector Vsi(dig).

* * * * *